(12) United States Patent
Wakabayashi et al.

(10) Patent No.: US 10,661,742 B2
(45) Date of Patent: May 26, 2020

(54) VEHICLE COLLISION SENSOR AND VEHICLE COLLISION DETECTION DEVICE USING SAME

(71) Applicant: DENSO CORPORATION, Kariya, Aichi-pref. (JP)

(72) Inventors: Asei Wakabayashi, Kariya (JP); Takatoshi Tanabe, Kariya (JP); Kazuhisa Hashimoto, Kariya (JP)

(73) Assignee: DENSO CORPORATIOn, Kariya, Aichi-pref. (JP)

(*) Notice: Subject to any disclaimer, the term of this patent is extended or adjusted under 35 U.S.C. 154(b) by 180 days.

(21) Appl. No.: 15/744,680

(22) PCT Filed: Jul. 5, 2016

(86) PCT No.: PCT/JP2016/003195
§ 371 (c)(1),
(2) Date: Jan. 12, 2018

(87) PCT Pub. No.: WO2017/017904
PCT Pub. Date: Feb. 2, 2017

(65) Prior Publication Data
US 2018/0208138 A1 Jul. 26, 2018

(30) Foreign Application Priority Data
Jul. 28, 2015 (JP) .................. 2015-148969

(51) Int. Cl.
*B60R 19/48* (2006.01)
*G01L 5/00* (2006.01)
(Continued)

(52) U.S. Cl.
CPC ........ *B60R 19/483* (2013.01); *B60R 21/0136* (2013.01); *B60R 21/34* (2013.01);
(Continued)

(58) Field of Classification Search
CPC ..... B60R 21/0136; B60R 21/34; B60R 21/36; B60R 21/38; B60R 2021/0004;
(Continued)

(56) References Cited

U.S. PATENT DOCUMENTS

| 7,304,566 B2 * | 12/2007 | Mae ................... B60R 21/0136 280/734 |
| 2009/0038403 A1 * | 2/2009 | Kamei .................. B60R 19/483 73/774 |

(Continued)

FOREIGN PATENT DOCUMENTS

| DE | 202011105867 U1 | 10/2011 | |
| JP | 2006-248508 A * | 9/2005 | ............ B60R 21/00 |

(Continued)

OTHER PUBLICATIONS

U.S. Appl. No. 15/742,354, filed Jan. 5, 2018, Wakabayashi, Asei.

*Primary Examiner* — Jason S Morrow
(74) *Attorney, Agent, or Firm* — Knobbe, Martens, Olson & Bear, LLP (57) ABSTRACT

A vehicle collision sensor includes a piezoelectric polymer film that includes a piezoelectric element deformed to generate an output voltage, and a pair of electrodes clamping the piezoelectric element from both its surfaces, at least one of the electrodes including divided pieces away from each other in a state where the at least one of the electrodes is joined to the piezoelectric element, and a conductive component that is clamped between the film and a bumper cover, which is provided on a front portion of a vehicle, or that is clamped between a fastening component, which attaches the film to the bumper cover, and the film, in a state where the film is attached to an inner surface of the bumper cover, so that the conductive component connects together the divided pieces from a side of the divided pieces, which is not joined to the piezoelectric element.

9 Claims, 9 Drawing Sheets

(51) Int. Cl.
  *B60R 21/0136* (2006.01)
  *G01L 1/18* (2006.01)
  *G01L 1/16* (2006.01)
  *B60R 21/34* (2011.01)
  *B60R 19/18* (2006.01)
  *B60R 21/00* (2006.01)

(52) U.S. Cl.
  CPC .................. *G01L 1/16* (2013.01); *G01L 1/18* (2013.01); *G01L 5/00* (2013.01); *G01L 5/0019* (2013.01); *G01L 5/0052* (2013.01); *B60R 2019/186* (2013.01); *B60R 2021/0004* (2013.01); *B60R 2021/343* (2013.01)

(58) Field of Classification Search
  CPC .......... B60R 2021/0006; B60R 19/483; G01L 5/0052; G01L 1/16; G01L 1/18
  See application file for complete search history.

(56) References Cited

U.S. PATENT DOCUMENTS

| | | | | |
|---|---|---|---|---|
| 2010/0294640 | A1* | 11/2010 | Bieck | B60R 21/0136 200/505 |
| 2018/0215336 | A1* | 8/2018 | Wakabayashi | B60R 21/0136 |

FOREIGN PATENT DOCUMENTS

| | | | | | |
|---|---|---|---|---|---|
| JP | 2009-35251 | A | * | 2/2009 | ......... B60R 21/0136 |
| JP | 2014-505629 | A | | 3/2014 | |

* cited by examiner

VEHICLE COLLISION SENSOR AND VEHICLE COLLISION DETECTION DEVICE USING SAME

CROSS REFERENCE TO RELATED APPLICATION

This application is based on Japanese Patent Application No. 2015-148969 filed on Jul. 28, 2015, the disclosure of which is incorporated herein by reference.

TECHNICAL FIELD

The present disclosure relates to a vehicle collision sensor detecting a collision of a pedestrian or the like with a vehicle, and a vehicle collision detection device using the vehicle collision sensor.

BACKGROUND ART

In an existing technique on a vehicle collision detection device, a cushioning body is provided behind a bumper cover, and a detection tube is disposed between the cushioning body and a cross member to detect a collision of a pedestrian with a front end portion of a vehicle (for example, see Patent Document 1). The collision detection device of that existing technique is intended to be able to detect a collision with a portion in a wide area of the bumper cover. In the existing technique, occurrence of a collision of a pedestrian with the bumper cover is detected when a pressure equal to or higher than a threshold is generated in the long detection tube extending in a vehicle width direction.

PRIOR ART DOCUMENT

Patent Document

Patent Document 1: JP2014-505629A

In that vehicle collision detection device, however, since a collision with the front end portion of the vehicle is detected via the cushioning body, when a collision occurs on the bumper cover in the front end portion of the vehicle, an impact due to the collision is attenuated during propagation to the cushioning body. Hence, for example, when a small impact is caused by a collision, the detection tube disposed behind the cushioning body has not been able to accurately detect an increase in pressure caused by the impact of the collision.

SUMMARY OF INVENTION

The present disclosure addresses the above issues. Thus, it is an objective of the present disclosure to provide a reliable vehicle collision sensor that can accurately detect occurrence of a collision with a vehicle, and a reliable vehicle collision detection device using the vehicle collision sensor.

To achieve the objective, a vehicle collision sensor in a first aspect of the present disclosure includes a piezoelectric polymer film that includes a piezoelectric element deformed to generate a predetermined output voltage, and a pair of electrodes clamping the piezoelectric element from both its surfaces, at least one of the pair of electrodes including a plurality of divided pieces away from each other in a state where the at least one of the pair of electrodes is joined to the piezoelectric element, and a conductive component that is clamped between the piezoelectric polymer film and a bumper cover, which is provided on a front portion of a vehicle, or that is clamped between a fastening component, which attaches the piezoelectric polymer film to the bumper cover, and the piezoelectric polymer film, in a state where the piezoelectric polymer film is attached to an inner surface of the bumper cover, so that the conductive component connects together the plurality of divided pieces from a side of the plurality of divided pieces, which is not joined to the piezoelectric element.

According to this configuration, the vehicle collision sensor includes a piezoelectric polymer film that generates an output voltage corresponding to the deformation amount of the bumper cover. This makes it possible to accurately detect occurrence of a collision on the bumper cover of the vehicle based on the output voltage directly affected by the deformation amount of the bumper cover. In addition, the vehicle collision sensor includes conductive components that are clamped by the piezoelectric polymer film and the bumper cover or by the fastening component to attach the piezoelectric polymer film to the bumper cover and the piezoelectric polymer film. Each conductive component connects between the divided pieces from a side on which each divided piece are not bonded to the piezoelectric element. Hence, when the piezoelectric polymer film is detached from the bumper cover, the conductive components are no longer clamped, and thus the connection between the divided pieces is released. Consequently, an energization condition between the divided pieces via the conductive components is normally monitored, making it possible to detect detachment of the piezoelectric polymer film from the bumper cover, leading to a reliable vehicle collision sensor.

A vehicle collision detection device in a second aspect of the present disclosure includes the vehicle collision sensor in the first aspect, a collision determination part that compares one of the output voltage generated by the piezoelectric polymer film and a detection voltage generated based on the output voltage with a predetermined voltage threshold, and that detects an occurrence of such a collision that needs to actuate a protection device, which protects a collided object, on the bumper cover of the vehicle when the one of the output voltage and the detection voltage is equal to or higher than the voltage threshold, and a detachment detection part that supplies electric power to one of the plurality of divided pieces and measures an electric potential of another one of the plurality of divided pieces to detect whether the piezoelectric polymer film is detached from the bumper cover.

According to this configuration, the vehicle collision detection device includes the piezoelectric polymer film that generates the output voltage corresponding to the deformation amount of the bumper cover. The collision determination part detects that a collision occurs on the bumper cover of the vehicle based on the output voltage generated by the piezoelectric polymer film. This makes it possible to accurately detect occurrence of a collision on the vehicle bumper cover based on the output voltage directly affected by the deformation amount of the bumper cover. In addition, it is possible to detect detachment of the piezoelectric polymer film from the bumper cover by the detachment detection part, leading to a reliable vehicle collision detection device. The vehicle collision detection device of the present disclosure is intended to detect not only a pedestrian collision but also any collision that requires actuation of a pedestrian protection device.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Hereinafter, a first embodiment and a second embodiment are described. Directions in the following description and FIGS. 1 to 13 are each assumed to coincide with a direction for a driver seated in a vehicle VE unless it is particularly defined. For example, in FIGS. 1 to 13, "front" means that the arrow direction indicates the front of the vehicle VE. The following description focuses on a collision of a pedestrian with the vehicle VE. However, the vehicle collision sensor and the vehicle collision detection device of the present disclosure each cover not only detection of the pedestrian collision but detection of a collision of any object, such as a bicycle and a stroller, requiring actuation of a pedestrian protection device.

First Embodiment

Figure 1:
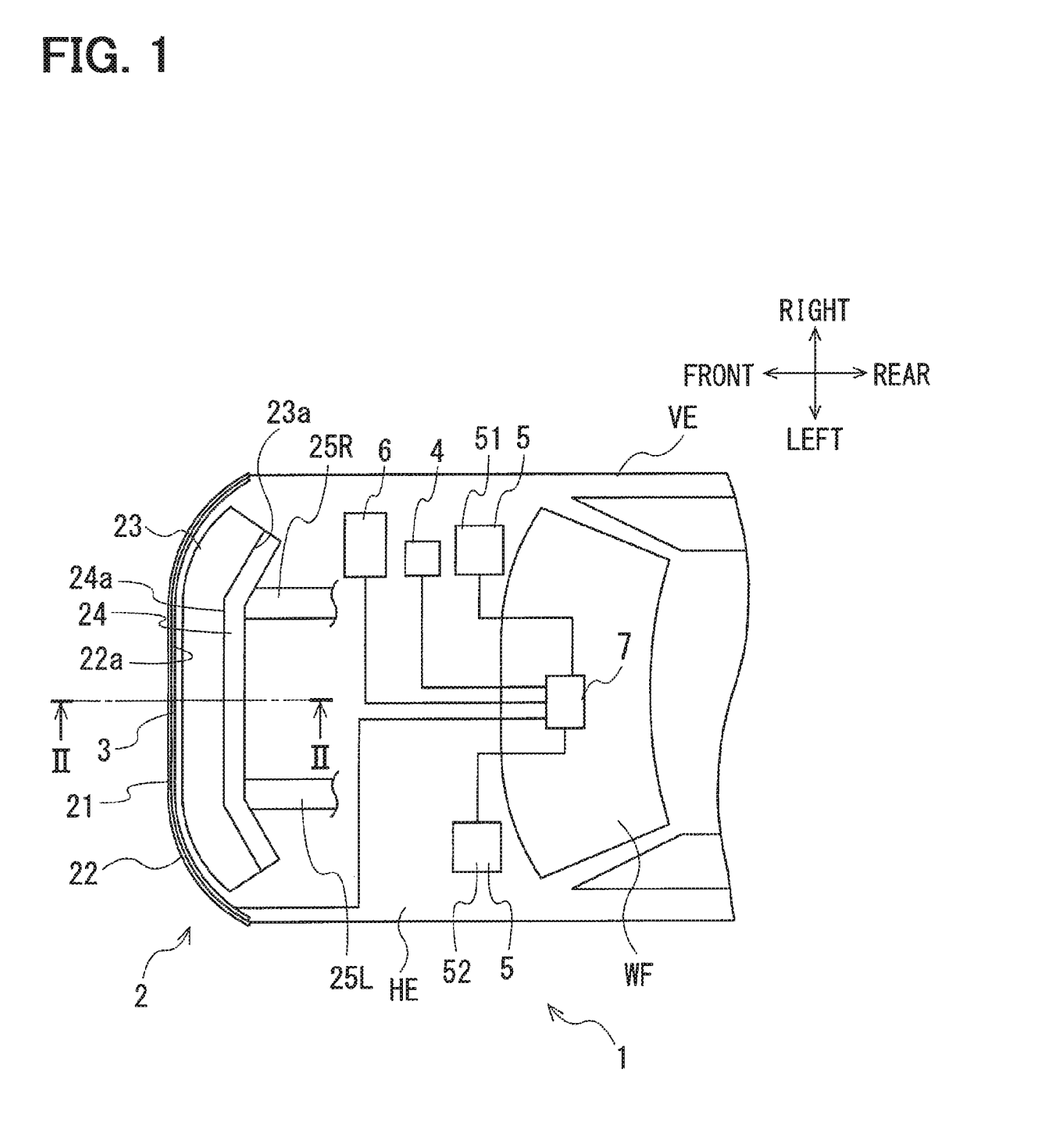
FIG. 1 is a plan view of a vehicle in which a pedestrian protection system of a first embodiment is mounted.

A pedestrian protection system 1 (corresponding to the vehicle collision detection device) of a first embodiment is described with reference to FIGS. 1 to 8. The overall configuration of the pedestrian protection system is described. As shown in FIG. 1, a front bumper 21 (corresponding to the front portion of the vehicle) is attached to the front end portion of the vehicle VE. The front bumper 21 extends in the left-right direction and includes a bumper cover 22 and a bumper absorber 23. The bumper cover 22 is made of a synthetic resin material and forms a design surface of the front portion of the vehicle VE. The bumper absorber 23 is provided, behind the bumper cover 22, as an impact absorbing material when a collision occurs on the front bumper 21. The bumper absorber 23 is made of a foamed resin such as foamed polypropylene, for example.

The bumper absorber 23 has a rear end surface 23a attached to a front surface 24a of a bumper reinforcement 24. The bumper reinforcement 24 is a reinforcement member made of a metallic material such as aluminum alloy and having a hollow interior, and extends in the left-right direction. The bumper reinforcement 24 is fixed to the front end portions of a pair of left and right side members 25R and 25L extending in the front-rear direction. A body unit 2 is formed by the front bumper 21, the bumper reinforcement 24, and the side members 25R and 25L.

Figure 2:
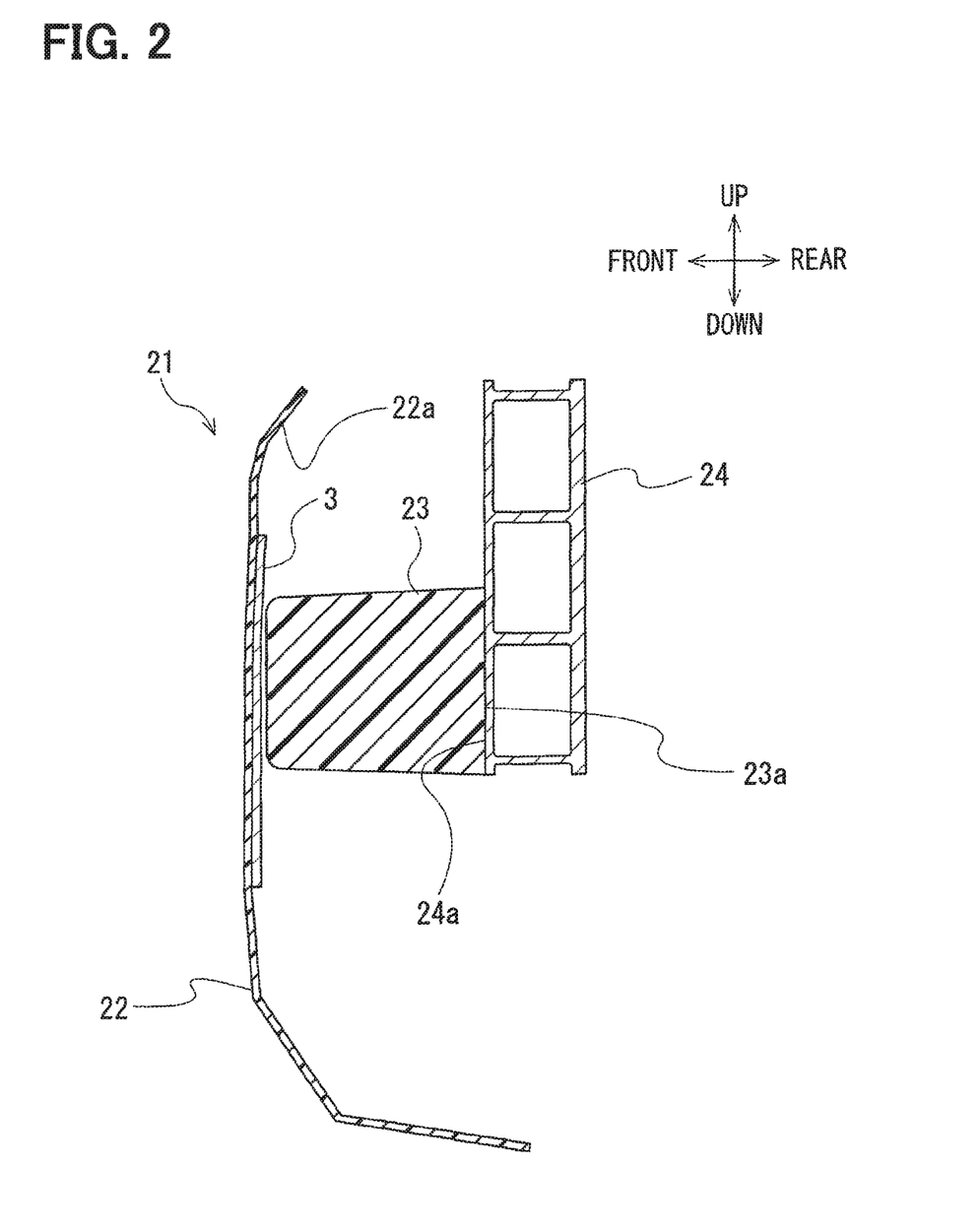
FIG. 2 is a sectional view along II-II in FIG. 1.
Figure 3:
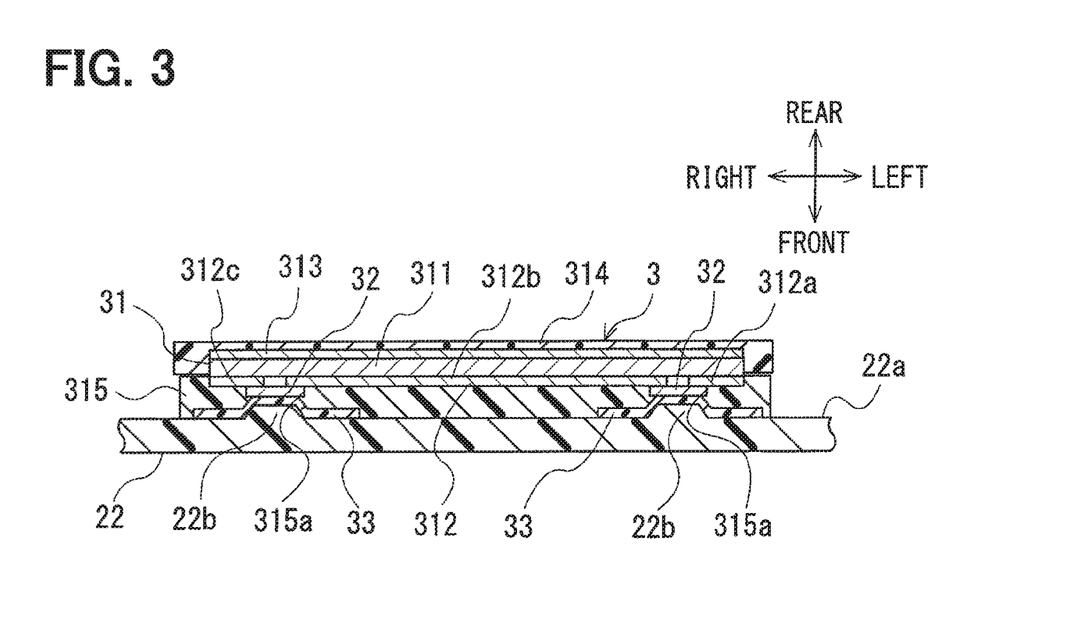
FIG. 3 is a sectional view of a collision detection sensor shown in FIG. 2 cut along a horizontal direction.

As shown in FIGS. 1 and 2, a collision detection sensor 3 (corresponding to the vehicle collision sensor) is attached to a back surface 22a (corresponding to the inner surface of the bumper cover), i.e., the rear surface of the bumper cover 22. The collision detection sensor 3 extends in the vehicle width direction (lateral direction) so as to connect between both end portions of the bumper cover 22. The collision detection sensor 3 may be attached on the vehicle VE at a height at which a pedestrian collision occurs. As shown in FIG. 3, the collision detection sensor 3 includes a piezo film 31 (corresponding to the piezoelectric polymer film). The piezo film 31 includes a piezo element 311 (corresponding to the piezoelectric element) formed in a thin film shape, and a first electrode 312 and a second electrode 313 (both correspond to the pair of electrodes) bonded to the piezo element 311. The first electrode 312 and the so second electrode 313 are each made of a conductive metal film such as a copper or aluminum film, and clamp the piezo element 311 from both surfaces of the piezo element 311. Hereinafter, the first electrode 312 and the second electrode 313 are collectively referred to as electrodes 312 and 313. The first electrode 312 is formed of a plurality of divided pieces 312a, 312b, and 312c disposed away from one another in an extending direction (corresponding to the vehicle width direction) of the piezo element 311 in the state where the first electrode 312 is bonded to the piezo element 311 (see FIG. 5).

The piezo element 311 is made of a piezoelectric polymer material such as polyvinylidene fluoride (PVDF), polypeptide, polylactic acid, polymethyl glutamate, and polybenzyl glutamate. When the bumper cover 22 is deformed by a collision, a tensile stress or a compressive stress is applied to the piezo film 31 due to the deformation, so that a predetermined output voltage (hereinafter, referred to as piezo film voltage Vpz) corresponding to a deformation amount Q of the bumper cover 22 is generated between the electrodes 312 and 313. The piezo film is a known film and disclosed in JP2004-96980A, JP2007-212436A, and JP2013-29368A, for example. The collision detection sensor 3 may be formed using a pyroelectric (pyro) film in place of the piezo film 3. The piezo film 31 includes a pair of electrode cover films 314 and 315 covering the electrodes 312 and 313 from a side on which each electrode is not in contact with the piezo element 311. The electrode cover films 314 and 315 are made of a synthetic resin material in a flexible thin film shape, and are bonded to the electrodes 312 and 313, respectively.

As shown in FIG. 3, the collision detection sensor 3 has a plurality of switch electrodes 32 (corresponding to the conductive components) made of a conductive metal. The switch electrodes 32 are each formed larger in a vehicle width direction than an interval between the divided pieces 312a, 312b, and 312c. The switch electrodes 32 are each in contact with two of the divided pieces 312a, 312b, and 312c, which are adjacent to each other in the vehicle width direction, from a side (bottom side in FIG. 3), on which each divided piece is not in contact with the piezoelectric element 311 so as to connect between the divided pieces 312a, 312b, and 312c (see FIG. 5). At this time, each switch electrode 32 is in contact with the divided piece 312a, 312b, or 312c through a slit 315a formed in the electrode cover film 315 while bending the electrode cover film 315. The switch electrode 32 is not bonded to any of the divided pieces 312a, 312b, and 312c.

The collision detection sensor 3 includes a plurality of switch cover films 33 (corresponding to the energization cover films) covering the switch electrodes 32 from a side on which each switch electrode 32 is not in contact with any of the divided pieces 312a, 312b, and 312c. Each switch cover film 33 is made of a synthetic resin material in a flexible thin film shape. The switch cover film 33 is bonded to the switch electrode 32 but is not bonded to the electrode cover film 315. Each of the electrodes 312 and 313 of the piezo film 31 has a thickness smaller than that of each of the electrode cover films 314 and 315 and the switch cover film 33.

An adhesive or a double-faced tape is interposed between a surface on a side opposite to the first electrode 312 and a back surface 22a of the bumper cover 22, the surface corresponding to a bottom surface of each of the electrode cover film 315 and the switch cover film 33 in FIG. 3. This allows the collision detection sensor 3 to be attached to the bumper cover 22. In the state where the piezo film 31 is attached to the bumper cover 22, the switch electrodes 32 are clamped by the piezo film 31 and the bumper cover 22 (see FIG. 3). A biasing protrusion 22b protruding toward the switch electrode 32 is provided in a pressing region against the switch electrode 32 on the bumper cover 22 (corresponding to on the bumper cover). In the state where the piezo film 31 is attached to the bumper cover 22, the biasing protrusion 22b presses the switch electrode 32 toward the first electrode 312 with the switch cover film 33 in between while bending the electrode cover film 315.

Returning to FIG. 1, a speed sensor 4 is provided in the vehicle VE so as to be attached to a wheel, a transmission, or the like of the vehicle VE to detect traveling speed of the vehicle VE. A cowl airbag device 51 is included in a pedestrian protection device 5 (corresponding to the protection device). When a pedestrian collides with the front bumper 21, the cowl airbag device 51 unfolds a bag from above an engine hood HE shown in FIG. 1 to a lower side of a front window WF to protect a colliding object such as the colliding pedestrian. A pop-up hood 52 is also included in the pedestrian protection device 5. When a pedestrian or the like collides with the front bumper 21, the pop-up hood 52 raises the rear end of the engine hood HE. As a result, the engine hood HE serves as a cushioning component to prevent a pedestrian from colliding with a rigid component such as an engine, and thus protects the colliding object such as the colliding pedestrian. An instrument panel 6 is provided in the front of a driver's seat of the vehicle VE. The instrument panel 6 is allowed to display a warning for a driver when detachment of the piezo film 31 from the bumper cover 22 is detected.

A configuration of a pedestrian protection ECU is described. In the vehicle VE, the pedestrian protection ECU 7 is mounted on a floor tunnel on the front side of an undepicted driver's seat. While not shown, the pedestrian protection ECU 7 is a control device formed of an input/output device, CPU, RAM, and the like. As shown in FIG. 1, the pedestrian protection ECU 7 is connected to the collision detection sensor 3, the speed sensor 4, the cowl air bag device 51, the pop-up hood 52, and the instrumental panel 6 via communication lines.

Figure 4:
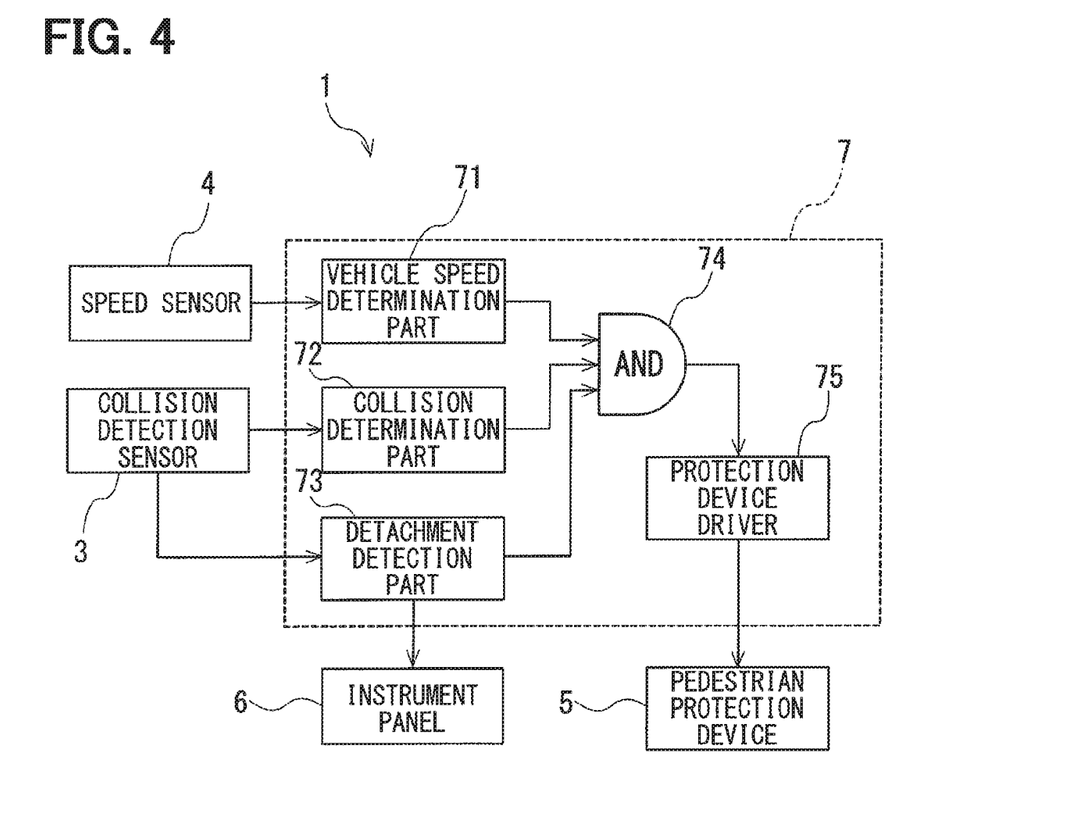
FIG. 4 is a block diagram showing a configuration of a pedestrian protection system of the first embodiment.

As shown in FIG. 4, the pedestrian protection ECU 7 includes a vehicle speed determination part 71, a collision determination part 72, a detachment detection part 73, an AND circuit 74, and a protection device driver 75. The vehicle speed determination part 71 is connected to the speed sensor 4. The vehicle speed determination part 71 determines whether or not a vehicle speed detection value Sdet from the speed sensor 4 is equal to or larger than a predetermined first vehicle speed threshold Sth1 and equal to or smaller than a predetermined second vehicle speed threshold Sth2. When the vehicle speed detection value Sdet is equal to or larger than the first vehicle speed threshold Sth1 and equal to or smaller than the second vehicle speed threshold Sth2, the vehicle speed determination part 71 outputs a high (H) signal. The collision determination part 72 is connected to the collision detection sensor 3. The collision determination part 72 compares the piezo film voltage Vpz received from the piezo film 31 to a predetermined voltage threshold Vth. When the piezo film voltage Vpz is equal to or higher than the voltage threshold Vth (corresponding to the voltage equal to or higher than a voltage threshold), the collision determination part 72 detects that a collision requiring actuation of the pedestrian protection device 5 occurs on the bumper cover 22, and outputs an H signal. For a reason of arithmetic processing, it is also possible that a predetermined detection voltage is determined based on the piezo film voltage Vpz, and when the detection voltage is equal to or higher than the voltage threshold Vth, the collision determination part 72 determines occurrence of a collision requiring actuation of the pedestrian protection device 5.

The detachment detection part 73 supplies power to one of the divided pieces 312a, 312b, and 312c, and measures the electric potentials of the remaining of the divided pieces 312a, 312b, and 312c, thereby detects presence of detachment of the piezo film 31 from the bumper cover 22. The detachment detection part 73 outputs the H signal while detecting no detachment of the piezo film 31 from the bumper cover 22. The detachment detection part 73 gives warning of detachment of the piezo film 31 from the bumper cover 22 on the instrument panel 6 while outputting no H signal. This makes it possible to call attention of a driver of the vehicle VE to repair the collision detection sensor 3. It is described later about a method of detecting presence of detachment of the piezo film 31 from the bumper cover 22 by the detachment detection part 73. Three input terminals of the AND circuit 74 are connected to the vehicle speed determination part 71, the collision determination part 72, and the detachment detection part 73, respectively. The AND circuit 74 outputs the H signal when any of the vehicle speed determination part 71, the collision determination part 72, and the detachment detection part 73 outputs the H signal. The protection device driver 75 is connected to the output terminal of the AND circuit 74, and operates the cowl air bag device 51 or the pop-up hood 52 when the AND circuit 74 outputs the H signal.

Figure 5:
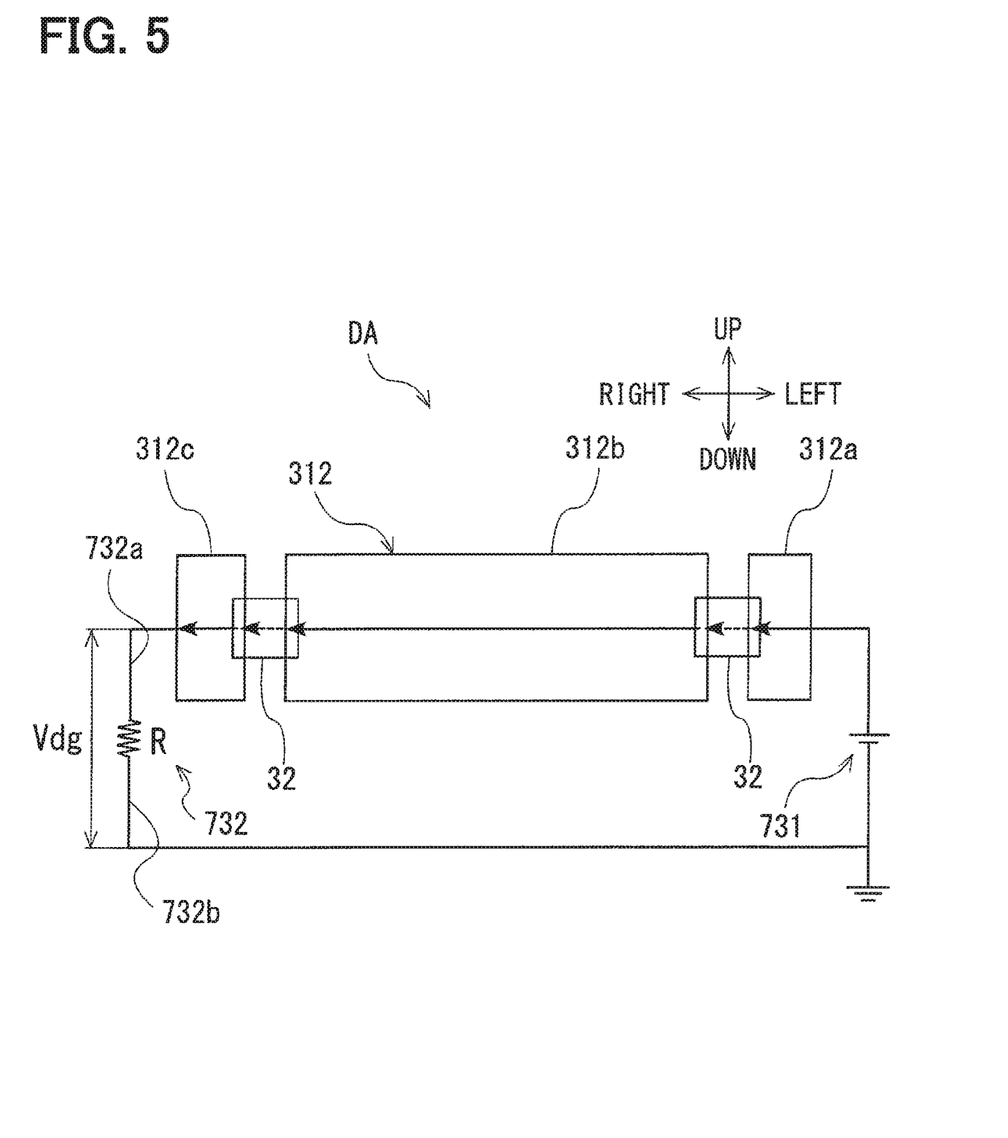
FIG. 5 schematically illustrates a first electrode in a state, in which power is supplied to the first electrode and a detection voltage is detected, in the first embodiment.

A method of detecting detachment of the piezo film is described. It is now described in detail about a method of detecting detachment of the piezo film 31 by the detachment detection part 73. As shown in FIG. 5, all the divided pieces 312a, 312b, and 312c included in the piezo film 31 are connected in series via the switch electrodes 32 to form one piece connection row DA. The divided piece 312a (corresponding to one end of the piece connection row) formed at the left end in the vehicle width direction is connected to a power supply 731 and receives power. The divided piece 312c (corresponding to the other end of the piece connection row) formed at the right end in the vehicle width direction is connected to one end 732a of a detection resistance 732, and the other end 732b of the detection resistance 732 is grounded together with the power supply 731.

Figure 6:
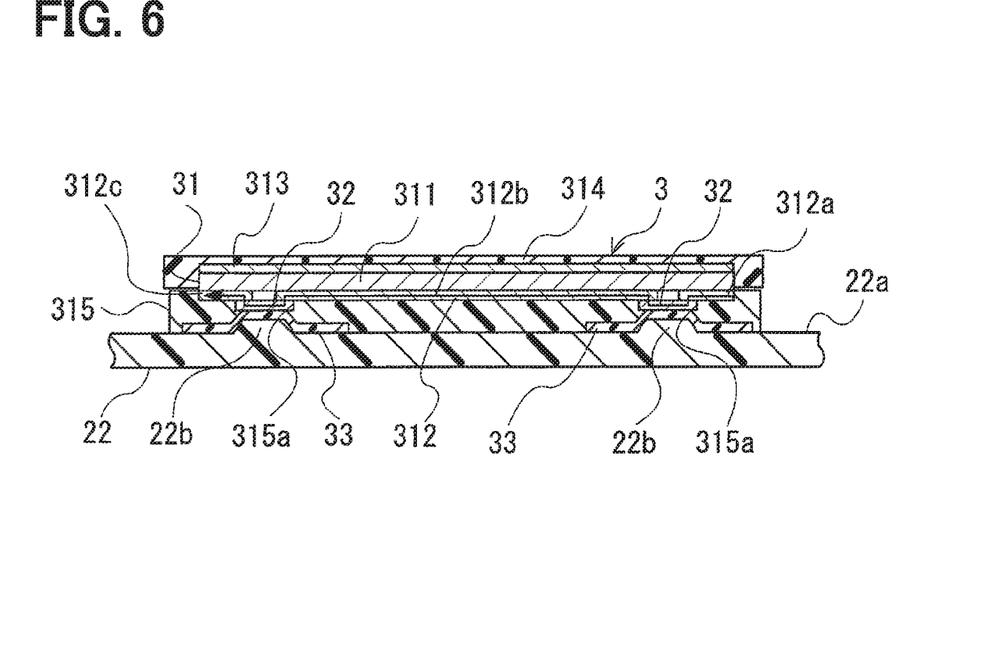
FIG. 6 is a sectional view of the collision detection sensor attached to a bumper cover in the first embodiment.
Figure 7:
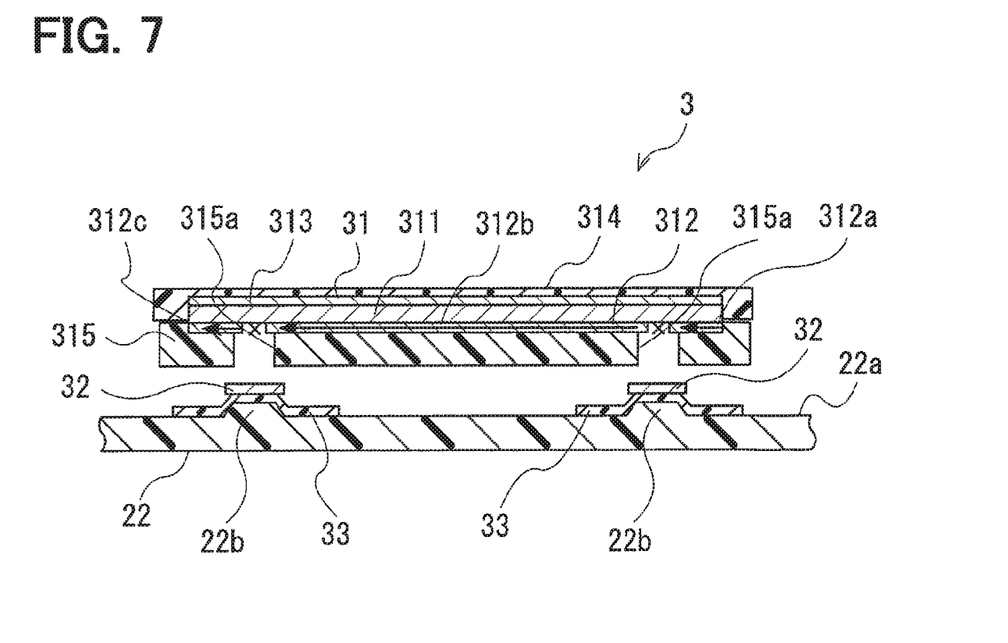
FIG. 7 is a sectional view of the collision detection sensor detached from the bumper cover in the first embodiment.

As shown in FIG. 6, in the state where the piezo film 31 is attached to the back surface 22a of the bumper cover 22, the switch electrodes 32 are clamped by the piezo film 31 and the bumper cover 22. As a result, the respective switch electrodes 32 are in contact with the divided pieces 312a, 312b, and 312c so as to connect between the divided pieces 312a, 312b, and 312c. Consequently, in this case, current flows from the divided piece 312a at the left end to the divided piece 312c at the right end (as indicated by an arrow in FIGS. 5 and 6). The current flowing through the divided pieces 312a, 312b, and 312c causes a detection voltage Vdg (corresponding to an electrical potential of the other end of the piece connection row) between the two ends 732a and 732b of the detection resistance 732. On the other hand, as shown in FIG. 7, when the piezo film 31 is detached from the bumper cover 22, the switch electrodes 32 are no longer clamped by the piezo film 31 and the bumper cover 22, and are thus released from the contact with the divided pieces 312a, 312b, and 312c. As a result, the current flowing through the divided pieces 312a, 312b, and 312c is broken (in FIG. 7, the broken portion of the current circuit is indicated by x), and the detection voltage Vdg becomes 0. Consequently, the detachment detection part 73 normally monitors the detection voltage Vdg, making it possible to detect presence of detachment of the piezo film 31 from the bumper cover 22.

A method of controlling the pedestrian protection system is described. A method of controlling the pedestrian protection system 1 by the pedestrian protection ECU 7 is now described with reference to FIG. 8. First, the detection voltage Vdg is sent to the detachment detection part 73 (step S101). Subsequently, the detachment detection part 73 determines whether or not the detection voltage Vdg is equal to or higher than a predetermined energization threshold Vfx (step S102). The energization threshold Vfx is set to a value similar to 0. If the detection voltage Vdg is determined to be less than the energization threshold Vfx, a warning of detachment of the piezo film 31 from the bumper cover 22 is given on the instrument panel 6 (step S109), and this control procedure ends.

Figure 8:
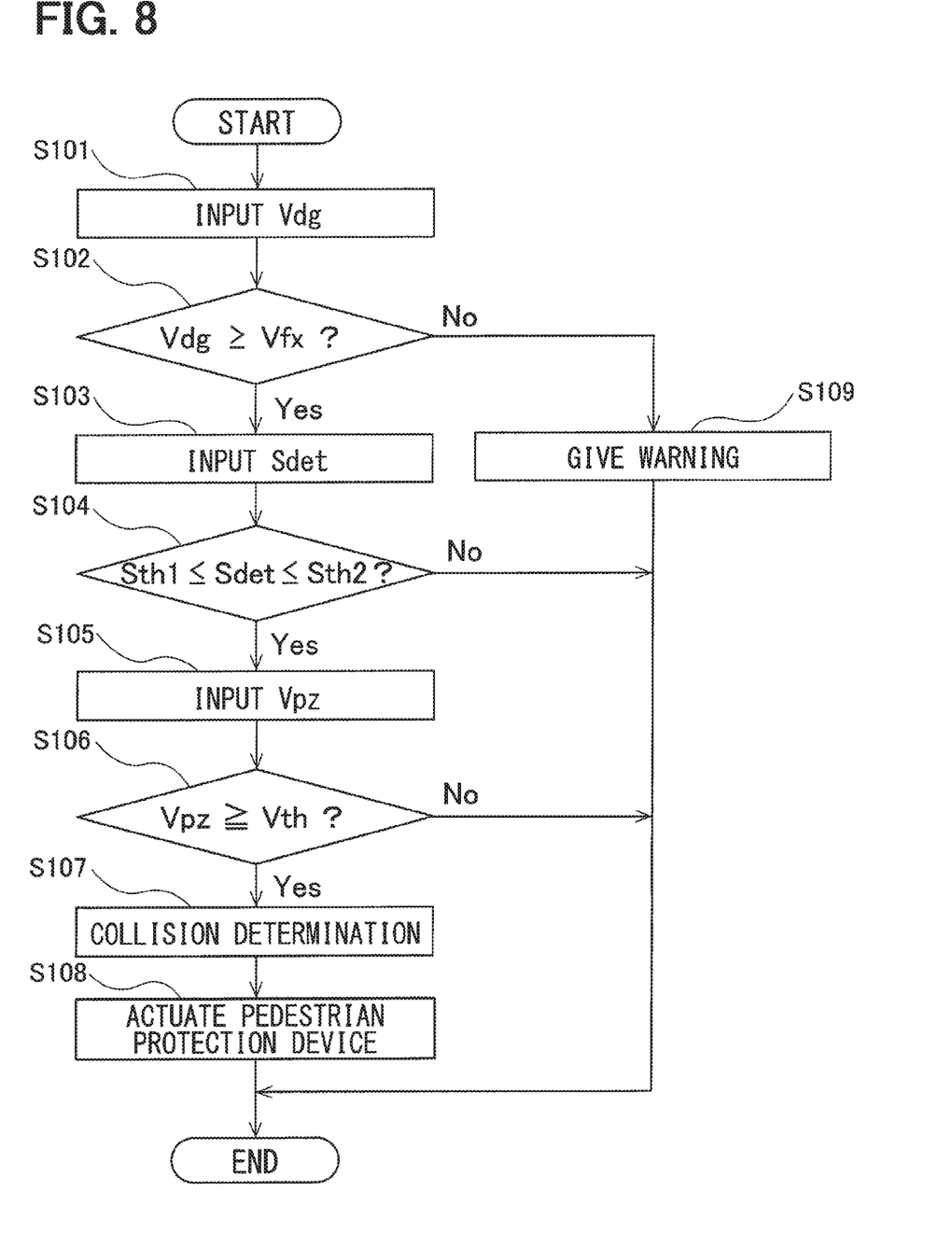
FIG. 8 illustrates a control flowchart of the pedestrian protection system of the first embodiment.

If the detection voltage Vdg is determined to be equal to or higher than the energization threshold Vfx, a vehicle speed detection value Sdet of the vehicle VE is sent from the speed sensor 4 to the vehicle speed determination part 71 (step S103). Subsequently, the vehicle speed determination part 71 determines whether or not the vehicle speed detection value Sdet is equal to or larger than the first vehicle speed threshold Sth1 and equal to or smaller than the second vehicle speed threshold Sth2 (step S104). If the vehicle speed detection value Sdet is determined to be smaller than the first vehicle speed threshold Sth1 or larger than the second vehicle speed threshold Sth2, this control procedure ends. If the vehicle speed detection value Sdet is determined to be equal to or larger than the first vehicle speed threshold Sth1 or equal to or smaller than the second vehicle speed threshold Sth2, the piezo film voltage Vpz is sent from the piezo film 31 to the collision determination part 72 (step S105).

It is determined whether or not the piezo film voltage Vpz received by the collision determination part 72 is equal to or higher than the voltage threshold Vth (step S106). The voltage threshold Vth is set between a piezo film voltage Vpz generated when a pedestrian or a bicycle collides with the bumper cover 22 and a piezo film voltage Vpz generated when a ground structure collides with the bumper cover 22. If the piezo film voltage Vpz is determined to be equal to or higher than the voltage threshold Vth, it is detected that a collision requiring actuation of the pedestrian protection device 5 occurs on the bumper cover 22 (step S107), and the pedestrian protection device 5 is actuated (step S108). If the piezo film voltage Vpz is determined to be lower than the voltage threshold Vth in step S106, this control procedure ends.

Functions and effects of the first embodiment are described. In the first embodiment, the collision detection sensor 3 includes the piezo film 31 that generates the piezo film voltage Vpz corresponding to the deformation amount of the bumper cover 22. This makes it possible to accurately detect occurrence of a collision on the bumper cover 22 of the vehicle VE based on the piezo film voltage Vpz directly affected by the deformation amount of the bumper cover 22. In addition, no tube for pressure detection is necessary to be provided in the bumper absorber 23, allowing the collision detection sensor 3 and the pedestrian protection system 1 to be easily manufactured. The collision detection sensor 3 includes the switch electrodes 32 clamped by the piezo film 31 and the bumper cover 22. The switch electrodes 32 are in contact with the divided pieces 312a, 312b, and 312c from the side on which each divided piece is not bonded to the piezo element 311 so as to connect between the divided pieces 312a, 312b, and 312c. Hence, when the piezo film 31 is detached from the bumper cover 22, the switch electrodes 32 are no longer clamped and thus not in contact with the divided pieces 312a, 312b, and 312c, so that the connection between the divided pieces 312a, 312b, and 312c is released. Consequently, the energization condition between the divided pieces 312a, 312b, and 312c via the switch electrodes 32 is normally monitored, which makes it possible to detect detachment of the piezo film 31 from the bumper cove 22, leading to a reliable collision detection sensor 3 and a reliable pedestrian protection system 1.

The adhesive or the double-faced tape is interposed between the piezo film 31 and the bumper cover 22, thereby the piezo film 31 is attached to the bumper cover 22 while the switch electrodes 32 are clamped by the piezo film 31 and the bumper cover 22. This makes it possible to easily provide the collision detection sensor 3 and the pedestrian protection system 1 capable of detecting detachment of the piezo film 31 from the bumper cover 22 without additional components such as a fastening component. The biasing protrusion 22b protruding toward the switch electrode 32 is provided in the pressing region against the switch electrode 32 on the bumper cove 22. As a result, the respective switch electrodes 32 can be securely brought into contact with the divided pieces 312a, 312b, and 312c regardless of thickness of the electrode cover film 315 in the state where the piezo film 31 is attached to the bumper cover 22. It is therefore possible to maintain energization between the divided pieces 312a, 312b, and 312c.

The piezo film 31 includes the pair of electrode cover films 314 and 315 covering the electrodes 312 and 313 from the side on which each electrode is not in contact with the piezo element 311. Further, the collision detection sensor 3 includes the switch cover films 33 covering the switch electrodes 32 from the side on which each switch electrode 32 is not in contact with any of the divided pieces 312a, 312b, and 312c. This makes it possible to protect the electrodes 312 and 313 and the switch electrodes 32 from a foreign substance or the like, leading to improvements in waterproof properties, insulation properties, and dust resistances of the electrodes 312 and 313 and the switch electrodes 32. The electrode cover films 314 and 315 and the switch cover films 33 are flexible, and thus do not hinder generation of the piezo film voltage Vpz when a collision occurs on the bumper cover 22. The detachment detection part 73 supplies power to one of the divided pieces 312a, 312b, and 312c, and measures the electric potentials of the remaining of the divided pieces 312a, 312b, and 312c, thereby detects presence of detachment of the piezo film 31 from the bumper cover 22. This makes it possible to securely detect detachment of the piezo film 31 from the bumper cover 22 with a simple configuration without increasing the components. All the divided pieces 312a, 312b, and 312c are connected in series via the switch electrodes 32 to form the one piece connection row DA. The detachment detection part 73 supplies power to a first end of the piece connection row DA and detects the electric potential of a second end of the row DA. As a result, for any number of the divided pieces 312a, 312b, and 312c, detachment of the piezo film 31 from the bumper cover 22 can be easily detected only by supplying power to the first end of the piece connection row DA while detecting the electric potential of the second end of the row DA. When a part of the piezo film 31 is detached from the bumper cover 22, such detachment can also be detected.

Second Embodiment

A configuration of a collision detection sensor 8 (corresponding to the vehicle collision sensor) of a second embodiment is now described with reference to FIGS. 9 to 12. As with the collision detection sensor 3 of the first embodiment, the collision detection sensor 8 of the second embodiment includes a piezo film 81. The piezo film 81 includes a piezo element 811 (corresponding to the piezoelectric element) clamped by a first electrode 812 and a second electrode 813 (both correspond to the pair of electrodes) from both surfaces of the piezo element 811. Hereinafter, the first electrode 812 and the second electrode 813 are collectively referred to as electrodes 812 and 813. The first electrode 812 is formed of a plurality of divided pieces 812a, 812b, and 812c disposed away from one another in the state where the first electrode is bonded to the piezo element 811. The divided pieces 812a, 812b, and 813c are arranged in the vehicle width direction in the state where the piezo film 81 is attached to the bumper cover 22. Two rows of the divided pieces 812a, 812b, and 813c arranged in the vehicle width direction are formed in an up-down direction (corresponding to a plurality of identical rows) with the divided piece 812c in common (see FIG. 10). The piezo film 81 further includes a pair of electrode cover films 814 and 815 covering the electrodes 812 and 813, respectively, from a side on which each electrode is not in contact with the piezo element 811. The electrode cover films 814 and 815 are bonded to the electrodes 812 and 813, respectively.

Figure 9:
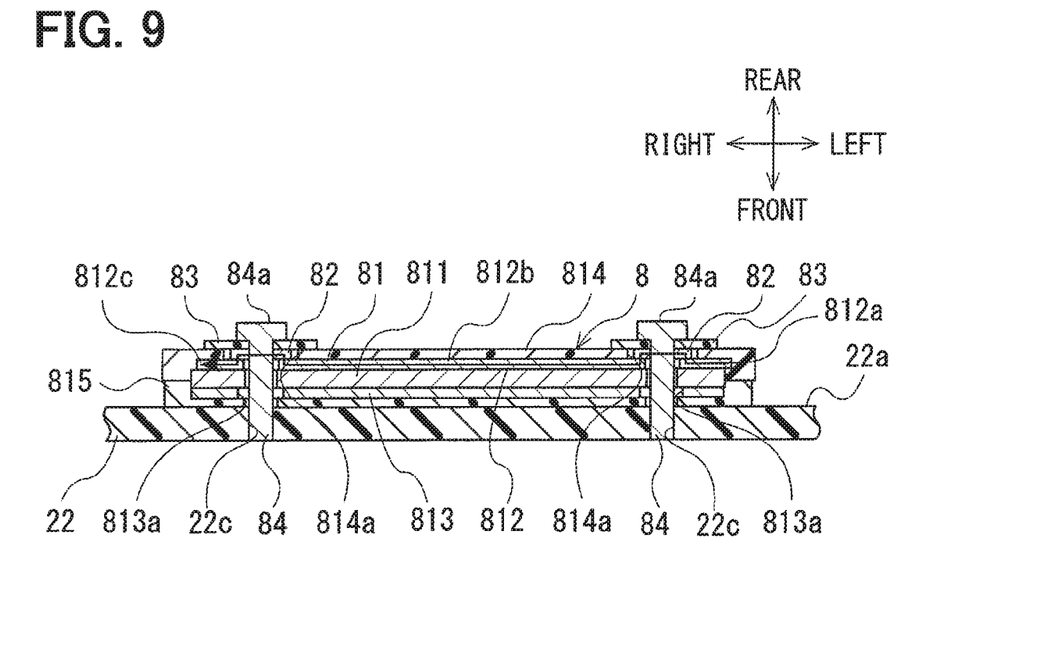
FIG. 9 is a sectional view of a collision detection sensor attached to a bumper cover in a second embodiment.

As shown in FIG. 9, as with the piezo film 31 in the first embodiment, the piezo film 81 has a plurality of switch electrodes 82 (corresponding to the conductive components). The switch electrodes 82 are each formed larger in the vehicle width direction than an interval between the divided pieces 812a, 812b, and 812c. The switch electrodes 82 are each in contact with two of the divided pieces 812a, 812b, and 812c, which are adjacent to each other in the vehicle width direction, so as to connect between the divided pieces 812a, 812b, and 812c. The switch electrode 82 is not bonded to any of the divided pieces 812a, 812b, and 812c. The piezo film 81 includes a plurality of switch cover films 83 (corresponding to the energization cover films) covering the switch electrodes 82 from a side on which each switch electrode 82 is not in contact with any of the divided pieces 812a, 812b, and 812c. Each switch cover film 83 is bonded to the switch electrode 82 but is not bonded to the electrode cover film 814. Each of the electrodes 812 and 813 of the piezo film 81 has a thickness smaller than that of each of the electrode cover films 814 and 815 and the switch cover film 83.

Unlike the piezo film 31 in the first embodiment, the piezo film 81 is fixed to the bumper cover 22 by a plurality of attachment bolts 84 (corresponding to the fastening components) passing through the piezo film 81 and the switch electrodes 82. As shown in FIG. 9, each attachment bolt 84 passing through the piezo film 81 and the switch electrode 82 is screwed in a screw hole 22c formed in the bumper cover 22. The piezo film 81 of the second embodiment is attached to the bumper cover 22 by fastening the attachment bolts 84 at four positions of an upper left end, a lower left end, an upper right end, and a lower right end in the vehicle width direction (see FIG. 10). In the second embodiment, the attachment bolts 84 are made of a nonconductor such as a synthetic resin material. However, as long as the outer peripheral surface of the attachment bolt 84 is designed to be not in contact with any of conductors such as the electrodes 812 and 813 and the switch electrode 82, material of the attachment bolt 84 may be a conductor such as metal. As shown in FIG. 11, the second electrode 813 has a plurality of bolt holes 813a through which the attachment bolts 84 pass. This allows the entire surface of the second electrode 813 to be conductive, so that when deformation of the bumper cover 22 is detected, the piezo film voltage Vpz is generated without hindrance. In the state where the piezo film 81 is attached to the bumper cover 22, the switch electrodes 82 are pressed to the divided pieces 812a, 812b, and 812c by bolt heads 84a (corresponding to the heads of the attachment bolts) of the attachment bolts 84 with the switch cover films 83 in between.

Figure 10:
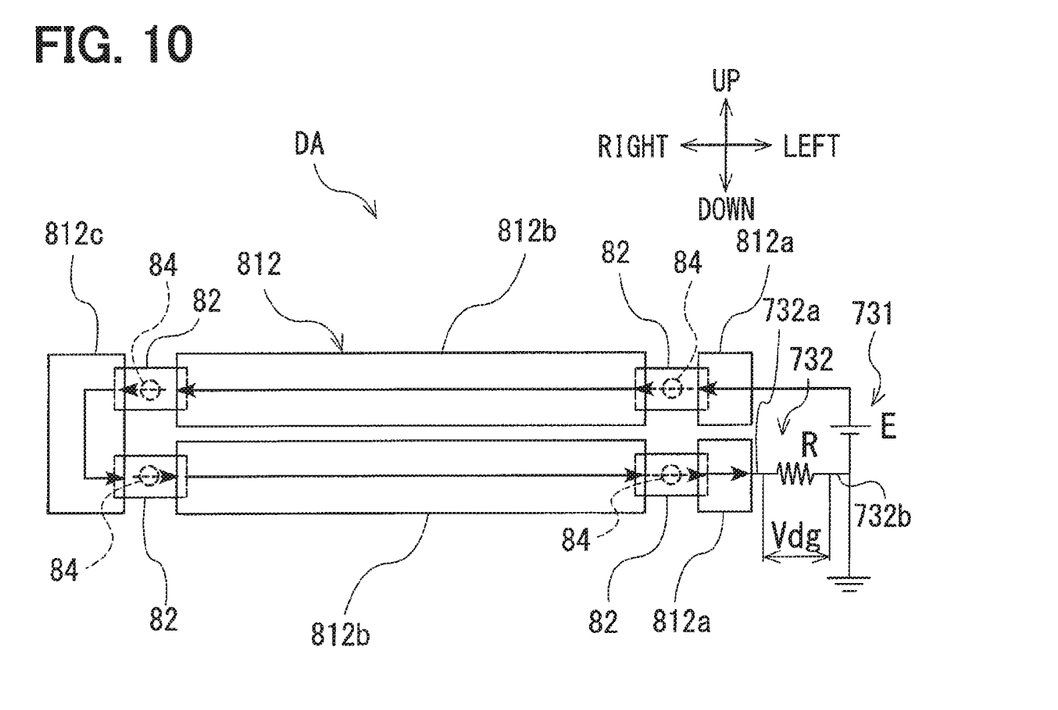
FIG. 10 schematically illustrates a first electrode shown in FIG. 9 in the state where power is supplied to the first electrode and a voltage is detected.
Figure 11:
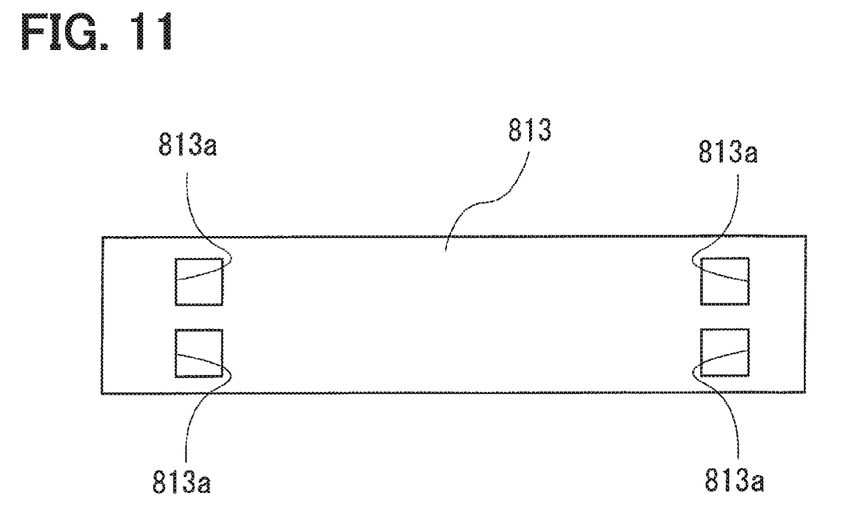
FIG. 11 is a front view of a second electrode shown in FIG. 9.

As shown in FIG. 10, all the divided pieces 812a, 812b, and 812c included in the piezo film 81 are connected in series via the switch electrodes 82 to form one piece connection array DA having a substantially C shape. As with the collision detection sensor 3 of the first embodiment, the divided piece 812a (corresponding to one end of the piece connection row) formed at the upper left end in the vehicle width direction is connected to a power supply 731 and receives power. The divided piece 812a (corresponding to the other end of the piece connection row) formed at the lower left end in the vehicle width direction is connected to one end 732a of a detection resistance 732, while the other end 732b of the detection resistance 732 is grounded together with the power supply 731.

Figure 12:
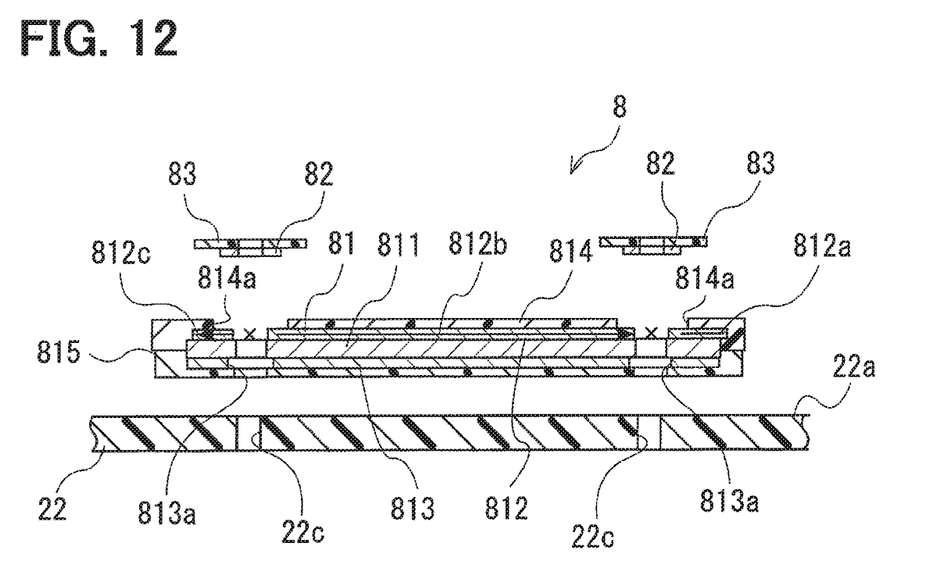
FIG. 12 is a sectional view of the collision detection sensor shown in FIG. 9 detached from the bumper cover.

As shown in FIG. 9, in the state where the piezo film 81 is attached to the back surface 22a of the bumper cover 22, the switch electrodes 82 are clamped by the bolt heads 84a of the attachment bolts 84 and the piezo film 81. As a result, the switch electrodes 82 are in contact with the divided pieces 812a, 812b, and 812c from the side (top side in FIG. 9), on which each divided piece is not in contact with the piezoelectric element 811, so as to connect between the divided pieces 812a, 812b, and 612c. Consequently, current flows from the divided piece 812a at the upper left end to the divided piece 812a at the lower left end (as indicated by an arrow in FIGS. 9 and 10). At this time, each switch electrode 82 is in contact with the divided piece 812a, 812b, or 812c through a slit 814a formed in the electrode cover film 814 while bending an electrode cover film 814. On the other hand, as shown in FIG. 12, when the piezo film 81 is detached from the bumper cover 22, the switch electrodes 82 are released from the contact with the divided pieces 812a, 812b, and 812c. As a result, the current flowing through the divided pieces 812a, 812b, and 812c is broken (in FIG. 12, the broken portion of the current circuit is indicated by x). Hence, as with the collision detection sensor 3 of the first embodiment, the detachment detection part 73 normally monitors the detection voltage Vdg (corresponding to the electrical potential of the other end of the piece connection row), making it possible to detect presence of detachment of the piezo film 81 from the bumper cover 22. Since the remaining configuration of the collision detection sensor 8 is similar to that of the collision detection sensor 3 of the first embodiment, further description is omitted.

Functions and effects of the second embodiment are described. In the second embodiment, the piezo film 81 is fixed to the bumper cover 22 by the attachment bolts 84 that are screwed in the bumper cover 22 while passing through the piezo film 81 and the switch electrodes 82. The switch electrodes 82 are pressed to the divided pieces 812a, 812b, and 812c by the bolt heads 84a of the attachment bolts 84. This makes it possible to improve reliability of attachment of the piezo film 81 to the bumper cover 22, and securely detect presence of detachment of the piezo film 81 from the bumper cover 22. In the state where the piezo film 81 is attached to the bumper cover 22, the plurality of divided pieces 812a, 812b, and 812c of the first electrode 812 are arranged in the vehicle width direction. Further, two rows of the divided pieces 812a, 812b, and 812c arranged in the vehicle width direction are provided in the up-down direction. As a result, the plurality of attachment bolts 84 passing through the switch electrodes 82 can be provided not only in the vehicle width direction but also in the up-down direction in order to connect between the divided pieces 812a, 812b, and 812c. Consequently, the piezo film 81 can be attached onto the bumper cover 22 without backlash, which further improves the attachment stability.

Figure 13:
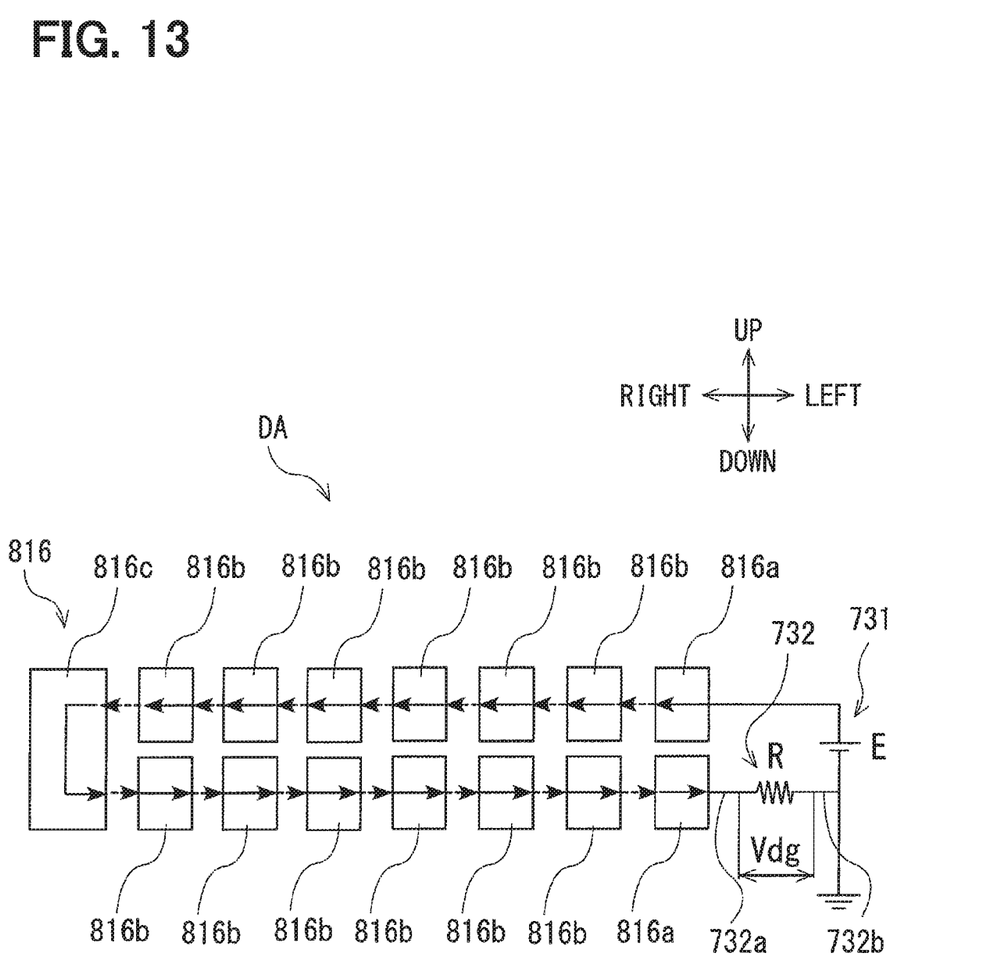
FIG. 13 schematically illustrates a first electrode of a modification of the second embodiment in the state where power is supplied to the first electrode and a voltage is detected.

The present disclosure is not limited to the above-described embodiments, and can be modified or expanded as follows. Modifications of the above-described embodiments are described. In the second embodiment, the number of the attachment bolts 84 to attach the piezo film 81 to the bumper cover 22 may be freely set according to a shape or size of the bumper cover 22. For example, as shown in FIG. 13, the first electrode 816 may be formed of a pair of divided pieces 816a disposed above and below at the left end in the vehicle width direction, a divided piece 816c disposed at the right end in the vehicle width direction, and six divided pieces 816b for each of upper and lower rows disposed between the divided pieces 816a and 816c. This makes it possible to increase the number of the attachment bolts 84 to 14, leading to improvement in stability of attachment of the piezo film 81 to the bumper cover 22. In FIG. 13, the switch electrodes 82 are omitted. Both the first electrode 312 and the second electrode 313 may be formed of divided pieces in such a manner that the switch electrodes 32 connect between the divided pieces of each electrode in the state where the piezo film 31 is attached to the bumper cover 22.

While the present disclosure has been described with reference to embodiments thereof, it is to be understood that the disclosure is not limited to the embodiments and constructions. The present disclosure is intended to cover various modification and equivalent arrangements. In addition, the various combinations and configurations, other combinations and configurations, including more, less or only a single element, are also within the spirit and scope of the present disclosure.

The invention claimed is:

1. A vehicle collision sensor comprising:
a piezoelectric polymer film that includes:
a piezoelectric element deformed to generate a predetermined output voltage; and
a pair of electrodes each of which is clamped against the piezoelectric element from both its surfaces, wherein at least one of the pair of electrodes includes a plurality of divided pieces away from each other in a state where the at least one of the pair of electrodes is joined to the piezoelectric element; and
a conductive component that connects together the plurality of divided pieces on a side of the plurality of divided pieces, which is not joined to the piezoelectric element, wherein the piezoelectric polymer film is attached to an inner side of a bumper cover, which is provided on a front portion of a vehicle.

2. The vehicle collision sensor according to claim 1, wherein the conductive component is provided between the piezoelectric polymer film and the bumper cover, or is clamped between a fastening component, which attaches the piezoelectric polymer film to the bumper cover, and the piezoelectric polymer film, in a state where the piezoelectric polymer film is attached to an inner surface of the bumper cover, so that the conductive component connects together the plurality of divided pieces on the side of the plurality of divided pieces, which is not joined to the piezoelectric element.

3. The vehicle collision sensor according to claim 1, wherein:
the piezoelectric polymer film is adhesively attached to the bumper cover; and
the conductive component is clamped between the piezoelectric polymer film and the bumper cover.

4. The vehicle collision sensor according to claim 3, wherein:
the bumper cover includes a biasing protrusion at its pressing region against the conductive component; and
the biasing protrusion protrudes toward the conductive component.

5. The vehicle collision sensor according to claim 1, wherein:
the piezoelectric polymer film is fixed to the bumper cover by an attachment bolt, which passes through the piezoelectric polymer film and the conductive component and is screwed in the bumper cover; and
the conductive component is pressed toward the plurality of divided pieces by a head of the attachment bolt.

6. The vehicle collision sensor according to claim 5, wherein:
the plurality of divided pieces are arranged side by side in a vehicle width direction in a state where the piezoelectric polymer film is attached to the bumper cover;
the plurality of divided pieces arranged side by side in the vehicle width direction constitute a row; and
the row of the plurality of divided pieces is one of a plurality of identical rows in an up-down direction.

7. The vehicle collision sensor according to claim 1, wherein the piezoelectric polymer film includes a pair of electrode cover films each of which covers a corresponding one of the pair of electrodes from its side that is not in contact with the piezoelectric element, the sensor further comprising an energization cover film that covers the conductive component from its side that is not in contact with the plurality of divided pieces.

8. A vehicle collision detection device comprising:
the vehicle collision sensor recited in claim 1;
a collision determination part that compares one of the output voltage generated by the piezoelectric polymer film and a detection voltage generated based on the output voltage with a predetermined voltage threshold, and that detects an occurrence of such a collision that needs to actuate a protection device, which protects a collided object, on the bumper cover of the vehicle when the one of the output voltage and the detection voltage is equal to or higher than the voltage threshold; and
a detachment detection part that supplies electric power to one of the plurality of divided pieces and measures an electric potential of another one of the plurality of divided pieces to detect whether the piezoelectric polymer film is detached from the bumper cover.

9. The vehicle collision detection device according to claim 8, wherein:
all of the plurality of divided pieces are connected to each other in series via the conductive component to form a piece connection row; and
the detachment detection part supplies electric power to one end of the piece connection row, and detects an electrical potential of the other end of the piece connection row.

* * * * *

UNITED STATES PATENT AND TRADEMARK OFFICE
CERTIFICATE OF CORRECTION

PATENT NO. : 10,661,742 B2
APPLICATION NO. : 15/744680
DATED : May 26, 2020
INVENTOR(S) : Asei Wakabayashi et al.

Page 1 of 1

It is certified that error appears in the above-identified patent and that said Letters Patent is hereby corrected as shown below:

On the Title Page

Item (73), under Assignee, in Column 1, delete "DENSO CORPORATIOn" and insert -- DENSO CORPORATION --.

Signed and Sealed this
Twenty-eighth Day of July, 2020

Andrei Iancu
*Director of the United States Patent and Trademark Office*